Sept. 21, 1937.                G. C. CLARK                 2,093,598
                    GLASS SUPPORTED DUAL CARD HOLDER
                         Filed Aug. 24, 1936
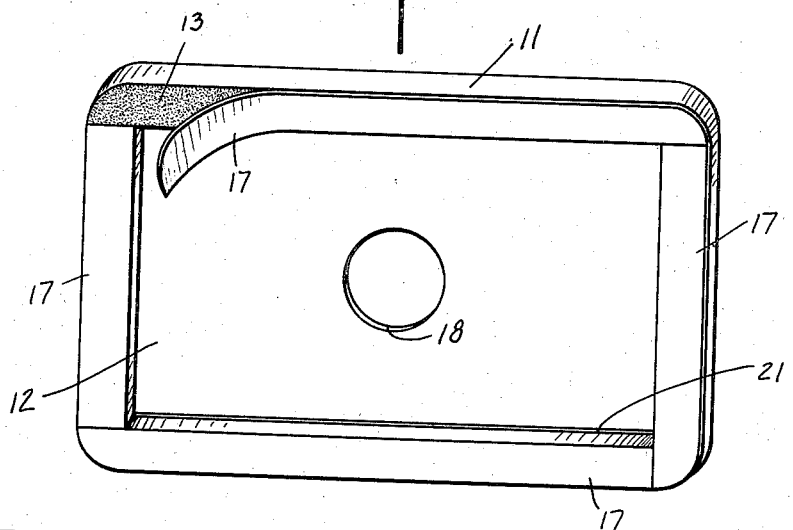
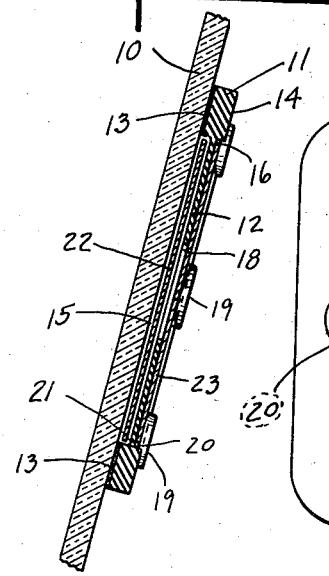
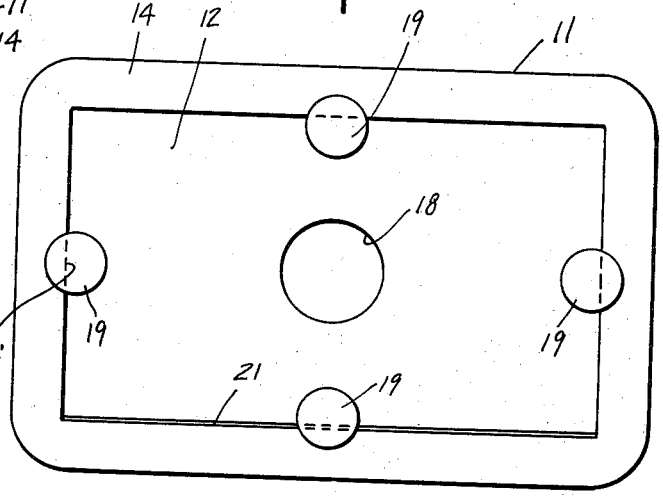
INVENTOR.
GEORGE C. CLARK.
BY
ATTORNEYS.

Patented Sept. 21, 1937

2,093,598

UNITED STATES PATENT OFFICE 2,093,598

GLASS SUPPORTED DUAL CARD-HOLDER

George C. Clark, Indianapolis, Ind.

Application August 24, 1936, Serial No. 97,634

5 Claims. (Cl. 40—10)

This invention relates to a card-holder suitable for reception of vehicle licenses and adapted for application to the interior surface of the windshield, or the like, of a vehicle for exposing to the exterior, the license card.

The chief object of this invention is to provide a card-holder suitable for the reception and retention of a vehicle license card and which is adapted for relatively easy mounting on the windshield of a vehicle for exposing the vehicle license exteriorly thereof and which is adapted to permit the removal of the old license card and reinsertion of a new license card whenever a new license is required and which is further adapted to receive other identifying data in the form of a card or the like, retain the same and expose the same to the operator of the vehicle.

The last mentioned (and operator exposed) card may be arranged to receive a caution message relative to safe driving or may be of the semi-permanent record type arranged to receive mileage data, gasoline consumption, oil consumption, travel expense data, and the like.

The chief feature of the invention consists in the formation of the device in unitary arrangement and from relatively flexible material, such as rubber, and preferably the card-holder is of integral character.

Another feature of the invention is the formation of the anchoring face such that it has a relatively tacky surface and, therefore, when of rubber, being relatively reactive to an adhesive such as rubber cement, if, as and when necessary, to secure the card holder to the glass windshield, or the like.

Another feature of the invention consists in an elongated slit in the card-holder adjacent one edge thereof for the removal and insertion of cards between the holder and its support (windshield).

Another feature of the invention consists in the provision of means for detachably holding another card or cards, exposed at the rear of the card-holder.

Other objects and features will be more fully set forth hereinafter.

The full nature of the invention will be fully understood from the accompanying drawing and the following description and claims:—

In the drawing, Fig. 1 is a perspective view looking toward the front of a card-holder embodying the invention previous to its application to a support, a portion of the protective covering for the tacky face thereof being partially removed.

Fig. 2 is a vertical sectional view through a portion of the windshield with the card-holder attached thereto and with the vehicle license card or like, exposed by the windshield, in the front of the card-holder and another card, or the like, being interiorly exposed and supported on the back of a card-holder.

Fig. 3 is a rear view of the card-holder.

In Fig. 2 of the drawing, 10 indicates a suitable card-holder supporting structure such as a windshield, or the like. In Fig. 2 and in the other figures, 11 indicates a peripheral frame portion of the desired outline. 12 indicates a back or closure portion which is positioned intermediate the faces 13 and 14 of the frame portion or main body portion and serves as a partition providing two exposed chambers 15 and 16, respectively, the former being closed by the windshield—see Fig. 2.

The face 13 of the frame or body portion has a tacky surface and the same is protected from exposure, dirt, drying out, vulcanization, and the like, by a protective covering such as holland or equivalent material 17. The partition 12 is provided with a central aperture 18, the purpose of which will be set forth hereinafter.

Projecting inwardly from the edges adjacent the face 14 of the frame and into the chamber 16 are the card retaining members 19. Herein—see Figs. 2 and 3—said portions 19 are integral with the frame or body portion of the card-holder and are spaced from the partition, there being a groove therebetween as indicated at 20. The partition in the present disclosure is provided with a slit 21 near the bottom for the purpose hereinafter to be set forth.

The card-holder, it is to be understood, is formed in one piece, except for the protective covering 17. It is also so formed that the windshield anchoring face has a tacky surface. This may be obtained by using rubber stock, subjecting it to simultaneous molding and vulcanization so that all of the parts except that immediately adjacent the face 13 and the face 13 are relatively completely vulcanized, the portion adjacent the face 13 being partially vulcanized and the face 13 naturally being relatively unvulcanized. By the foregoing description of the condition of the rubber at the face or adjacent thereto, it is to be understood that the same preferably should be tacky but if not tacky, it should be receptive to rapid solution by rubber cement solvent so that when rubber cement is applied to this face and permitted to momentarily dry—that is, the solvent evaporates, there will be deposited on this anchoring face 13 of the card-holder a layer of raw rubber from the cement which will be homogeneously united to that portion of the card-holder at the face 13 and immediately adjacent thereto. When the card-holder is applied to the supporting surface, such as the windshield and hand pressure application is enforced thereon, the card-holder will be adhesively secured to the windshield and the longer it remains in that condition, the stronger will become the anchorage therebetween.

A card-holder such as shown in Fig. 1, first, has the protective holland removed from the face 13. Then if that face be not sufficiently tacky for adhesion to the glass, rubber cement may be applied, as before stated. In either instance, the card-holder is then pressure mounted on the windshield. After mounting, the vehicle license or other identifying card 22 has its upper edge inserted through the slit 21 and for this purpose, the lowermost projection 19, if utilized, is turned back to permit such reception. The card is forced upwardly and into the chamber 15 and the upward movement may be facilitated by upwardly directed finger pressure applied to the back of the card through the opening 18.

When it is desired to remove this card and replace it with a later or different license card, the back of the card is engaged by the finger or an instrument through the opening 18 and the card forced downwardly and outwardly through the slit 21, the partition adjacent the lower portion of the frame or body portion being moved outwardly by a thin implement, such as a table knife, or the like.

The insertion of the interiorly exposed card 23 into the open faced chamber 16 obviously requires merely the positioning of the card in the chamber opening and the positioning of the edges of said card behind the card retaining projections 19 by having the edges of the card nest in the respective grooves 20 between the partition and the projections.

To reenforce these projections, in view of the relative thinness of the card-holder which can be held to within ¼" in thickness, the exposed faces of the projections 19 lie in a plane parallel to and slightly spaced from the plane of the face 14.

It will be understood in order to remove or insert a card from or into chamber 15, respectively, the "interior" exposed card 23 preferably should be removed and then remounted after the exteriorly positioned card is mounted.

While the invention has been described in great detail in the foregoing specification, the same is to be considered as illustrative and not restrictive in character, for various modifications will readily suggest themselves to persons skilled in this art, and these are all considered to be within the broad scope of the invention, reference being had to the appended claims.

The invention claimed is:—

1. A molded card holder for anchorage to a transparent supporting member, such as a windshield, including a body portion of peripheral frame character, an intermediate closure portion integral therewith and positioned inwardly from opposite faces of the frame to form two oppositely directed card receiving chambers therewith, whereby a card may be retained in the chamber exposible through the transparent member by the contact of the holder frame to the member when anchored thereto, and card retaining means for the other chamber integral with the frame portion and projecting inwardly therefrom and in spaced and overlapping relation to the closure portion for retaining a second card in the other and oppositely directed chamber.

2. A device as defined by claim 1, characterized by the intermediate closure portion including a central aperture therein for facilitating card insertion into and release from the first mentioned chamber.

3. A device as defined by claim 1, characterized by the peripheral frame being of complete encompassing type, and the closure portion including an elongated slit immediately adjacent the frame portion and of a length sufficient for card passage therethrough to the first mentioned chamber.

4. A device as defined by claim 1, characterized by the peripheral frame being of complete encompassing type, and the closure portion including an elongated slit immediately adjacent the frame portion and of a length sufficient for card passage therethrough, and by the intermediate closure portion including a central aperture therein for facilitating card insertion into and release from the first mentioned chamber through the slit.

5. A device as defined by claim 1, characterized by the card-holder being of molded rubber and the surface of the frame portion for positioning against the member being coplanar and tacky for adhesive connection thereto, and by the addition of a readily removable protective covering for maintaining said surface tacky until applied to the member.

GEORGE C. CLARK.